United States Patent [19]

Sohler et al.

[11] Patent Number: 5,473,722
[45] Date of Patent: Dec. 5, 1995

[54] RARE-EARTH-DOPED LITHIUM NIOBATE WAVEGUIDE STRUCTURES

[75] Inventors: Wolfgang Sohler; Hubertus Suche, both of Paderborn, Germany

[73] Assignee: Pirelli Cavi S.p.A., Milan, Italy

[21] Appl. No.: 94,199

[22] PCT Filed: Feb. 1, 1991

[86] PCT No.: PCT/EP91/00185
§ 371 Date: Jul. 28, 1993
§ 102(e) Date: Jul. 28, 1993

[87] PCT Pub. No.: WO92/14176
PCT Pub. Date: Aug. 20, 1992

[51] Int. Cl.[6] ................................................ G02B 6/00
[52] U.S. Cl. .................................... 385/132; 372/20
[58] Field of Search ................................ 385/123, 129, 385/130, 132; 372/20, 21, 22, 75

[56] References Cited

U.S. PATENT DOCUMENTS 5,128,948  7/1992  Papuchon et al. .............. 372/20 X

OTHER PUBLICATIONS

E. Lallier et al.: "Nd:MgO: LiNbO$_3$ waveguide laser and amplifier", *Optics Letters*, vol. 15, No. 12, (15 Jun. 1990), pp. 682–684.
M. J. Li et al.: "Optical waveguide fabrication in neodymium–doped lithium niobate", *Electronics Letters*, vol. 24, No. 15 (21 Jul. 1988), pp. 914–915.
A. C. G. Nutt et al.: "Simple control of Ti–diffused LiNbO$_3$ waveguide profile and propagation characteristics", *Electronics Letters*, vol. 24, No. 1, (7 Jan. 1988), pp. 56–58.
K. Komatsu et al.: "Titanium magnesium double diffusion method for efficient fibre–LiNbO$_3$ waveguide coupling", *Electronics Letters*, vol. 22, No. 17, (14 Aug. 1986), pp. 881–882.
H. Toda et al.: "Optical integrated circuit for a fiber laser doppler velocimeter", *Journal of Lightwave Technology*, vol. LT–5, No. 7 (Jul. 1987), pp. 901–905.
R. Brinkmann et al.: "Absorption, fluorescence and stimulated emission in Ti–diffused Er: LiNbO$_3$ waveguides", *Proceedings of the SPIE—the International Society for Optical Engineering*, vol. 1362, Pt. 1, pp. 377–382. (1990) Conference Date Oct. 28–Nov. 2, 1990.
S. Iraj Najafi et al.: "Ion–exchanged rare–earth doped waveguides", *Proceedings of the SPIE—The International Society for Optical Engineering*, vol. 1128, (1989), pp. 142–144.
R. Brinkmann et al.: "Annealed Erbium–implanted single–mode LiNbO$_3$ waveguides", *Optical Soc. of Amer., Tech. Digest Series*, vol. 5 (1990), pp. 188–191.

*Primary Examiner*—Akm E. Ullah
*Attorney, Agent, or Firm*—Brooks Haidt Haffner & Delahunty

[57] ABSTRACT

In a waveguide structure with diffused rare-earth doping in a light channel arranged lithium niobate crystal surface, the rare-earth doping is arranged in an effective rare-earth doping region approximately coaxially with the light guide channel; the light guide channel is diffused directly frown the crystal surface and its expansion is laterally limited.

24 Claims, 3 Drawing Sheets

FIG. 4
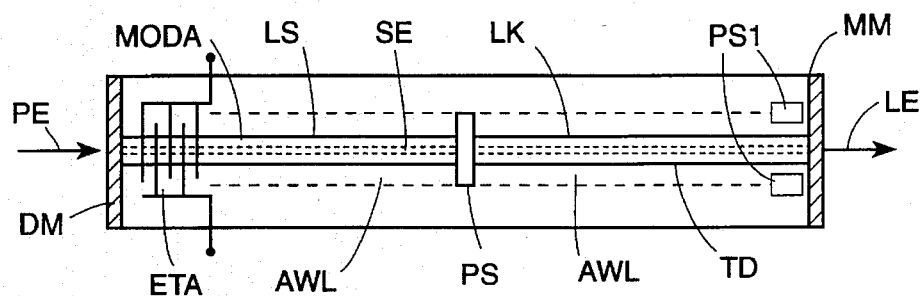
FIG. 5
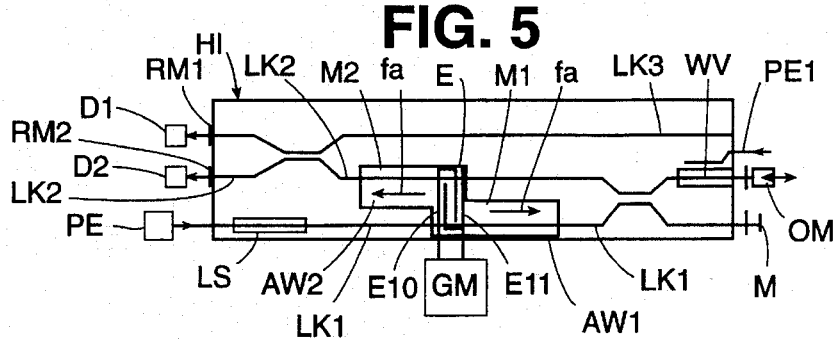
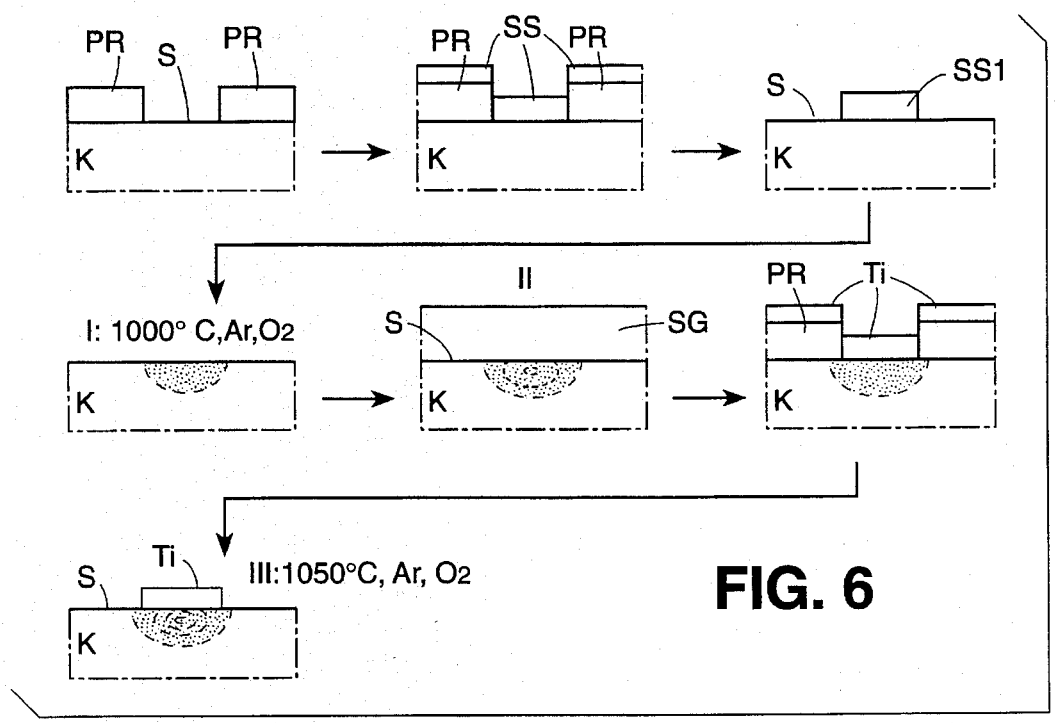
FIG. 6

RARE-EARTH-DOPED LITHIUM NIOBATE WAVEGUIDE STRUCTURES

BACKGROUND OF THE INVENTION

The invention relates to a waveguide structure with diffused rare-earth doping in a light-guide channel arranged in a lithium niobate crystal surface.

From R. Brinkmann et al, "Annealed erbium-implanted single-mode LiNbO3 waveguides", 1990, OSA Techn. Digest Series, Vol. 5, post deadline paper, PD1, an erbium-doped lithium niobate optical fibre waveguide is known which is manufactured by means of erbium ion implantation and subsequent tempering. This involves planar arrangement of the erbium doping close to the surface. The erbium ion beams destroy the crystal structure close to the surface, and this destruction has to be healed again in a separate stage of the process, so that the crystal becomes optically useful once more. So long as the healing is by means of a heat treatment, the greater mobility which they enjoy in the destroyed region means that the embedded erbium atoms prefer to migrate towards the surface of the crystal and less so into the depths, which is where the light-guide channel requires effective erbium doping. Besides, no narrow lateral doping boundary to the narrow light-guide channel is provided, and this gives rise to erbium fluorescence losses due to reabsorption in the lateral ridges and troughs of the waveguide channel, since the $^4I_{14/2}-^4I_{15/2}$ erbium fluorescence junction is part of a three-level system and results in the ground state.

SUMMARY OF THE INVENTION

It is the object of the invention to disclose rare-earth-doped waveguide structures of enhanced optical quality, viz. having lower dispersion losses and higher amplification constants, as well as exhibiting increased absorption of pumping radiation, to be used for integrated optical amplifiers and lasers, manufactured using a production process simplified for implantation engineering.

This object is achieved by the fact that the rare-earth doping is arranged in an effective rare-earth doping region approximately coaxially with the light-guide channel, said doping region is diffused directly from the crystal surface and its expansion is laterally limited.

Advantageous embodiments are indicated in the subsidiary claims.

It is especially advantageous if the effective expansion of the rare-earth doping is less than that of the light-guide channel laterally or depthwise or, in particular, on all sides. It is especially advantageous if the maximum doping is located beneath the surface of the crystal and preferably coincides more or less with the focus of the light distribution in the light-guide channel.

Using erbium as the rare earth has proved to be especially advantageous, since its small ion diameter allows relatively good mobility in the diffusion process. Other rare earths, e.g. neodyme, require longer diffusion operations or much higher diffusion temperatures.

The waveguide structures can be produced overlapping the erbium doping by using a conventional titanium diffusion doping technique. Because the titanium diffusion temperature and the diffusion time of titanium sufficing to form a waveguide also allow the rare earth to penetrate deeper into the crystal, it is best to take this tempering process into account when calculating the final diffusion depth of the rare earth. At the same time, titanium's more rapid diffusion provides the desired greater expansion of the light-guide channel than of the rare-earth doping region.

The light-guide channel may also be produced surrounding the rare-earth doping region in the form of a proton exchange waveguide, with lithium ions being replaced in conventional manner by hydrogen ions.

The rare-earth-doped waveguide can advantageously be used for an optical travelling-wave amplifier in which an input light wave and a pumping wave are supplied to said amplifier. It is advantageous if the light-guide channel is bounded to the rear by a wavelength-selective mirror. This mirror reflects the pumping wave into the active region, thereby making double use of said wave to amplify the input light wave. The amplified light wave passes through the mirror, since for its frequency the mirror is only slightly reflective.

A particularly short and effective travelling-wave amplifier can be made by coupling the pumping wave directly into the optically active rare-earth doping region of the light-guide channel via an integrated optical separating filter.

It is possible in a particularly advantageous manner to integrate various other components with the light-guide channel, e.g. wavelength filters and/or polarising filters and also modulators, said filters either being arranged separately from the optically active rare-earth doping region or integrated with the latter and effectively heterodyned therewith.

It is possible to arrange an integrated optical wavelength filter having controlled selectivity on the light-guide channel. This enables a travelling-wave amplifier to be controlled in such a manner that wavelength-selective amplification of the input light wave takes place. The result is a narrow-band fully-selective optical amplifier.

In particularly advantageous manner it is possible to arrange a travelling-wave amplifier jointly optically coupled to a lossy integrated optical component arranged on the same crystal substrate, said travelling-wave amplifier being so designed and its amplification so controlled, for instance by supplying carefully measured pump waves, that together with the lossy additional component it forms a loss-free assembly known also as an O-dB assembly.

If the light-guide channel with rare-earth doping is bounded on both sides by a mirror, which may be a dielectric, metallic or relief-lattice-type mirror, the result is a laser. A pumping wave is fed in conventional manner into the latter, and the light generated is emitted in conventional manner by one of the mirrors.

It is an advantage to produce such a laser directly on the same substrate on which at least one more optical component is formed, which is either arranged outside the laser resonator and optically coupled thereto, or is effectively arranged within the laser resonator. Such an optical component may be both arranged separate from the rare-earth doping region but also in many instances directly heterodyned therewith in a space-saving and low-loss manner, with the result that the active region of the laser and of the optical component coincide. This allows the laser's emission to be directly influenced by controllable operating elements. In particular, controllable electro-optical, acousto-optical or non-linear optical transducers may advantageously be integrated with a laser, enabling the phase, amplitude and/or frequency of the emission generated to be controlled.

In exemplary manner an electro-optical phase modulator may be heterodyned with the active region of the laser. Electrical control of the modulator field is advantageously performed in phase with the differential frequency of neighbouring axial eigenmodes of the laser, so mode coupling gives rise to a periodic sequence of laser emission pulses.

If a controllable acousto-optical modulator is effectively heterodyned with the laser, said modulator can then be controlled so that it forms a mode converter and accordingly effects Q-switching of the laser resonator in controlled manner. This means that short laser pulses can be emitted in controlled manner.

In advantageous manner it is possible to integrate with a laser a two-stage acousto-optical polarising converter, portions of which are equipped with interposed polarisers, each of which transmit one or other polarisation and hence act as wavelength filters. In this manner a narrow-band emission occurs at each end, the frequency of which may be continuously determined by control of the electro-acoustic transducer. The result is thus a continuously controllable laser.

One particularly advantageous application both of the integrated laser and of an attenuation-compensating travelling-wave amplifier results from combining them with a heterodyne interferometer comprising optical components integrated on the same substrate. Using the travelling-wave amplifier to amplify the little light reflected by the test subject results in high sensitivity of the measuring device. Integrating the laser on the same substrate avoids dispersion losses at the crystal entrance.

The manufacturing process for the rare-earth doping regions is relatively straightforward because no high-energy beams are needed and the crystal does not have to be destroyed and subsequently healed again. Conventional techniques can be used to produce the narrow doping strips in the crystal. In particular, photolithography is suitable, e.g. in combination with the lift-off technique, for producing a narrow strip of a sputtered or high-vacuum-deposited rare-earth metal or rare-earth metal oxide. This strip can then for example be diffused into the crystal in an argon and oxygen atmosphere.

Another method involves carrying out rare-earth doping of the lithium niobate crystal over a large area, after which a photoresist technique is used to produce a narrow photoresist strip thereon, at which point the uncoated surface is etched, causing the surplus doping region to be stripped away laterally, leaving a raised doped channel on the crystal.

In particularly advantageous manner, the effectiveness and susceptibility to leakage of the narrow rare-earth doping region can be enhanced by surface diffusion outwards into a sol gel, thereby producing the maximum concentration at a given depth. This reduces losses at the margins and surface. The depthwise diffusion that occurs during outward diffusion will ideally be taken into account in the overall planning of the various tempering steps, viz. the initial inward diffusion, subsequent outward diffusion and, if applicable, light-channel diffusion, so that the overall depth of the rare-earth diffusion remains less than the depth of the titanium diffusion.

If the light-guide channel is produced by proton exchange, this is done in conventional manner by means of a metallic mask orientated across the rare-earth doping region. Such a light-guide channel is particularly suited to components where wave propagation is only desired in a polarisation.

BRIEF DESCRIPTION OF THE DRAWINGS

The invention is illustrated with the aid of FIGS. 1 to 8.

FIG. 4 shows a laser with an acousto-optical transducer;

FIG. 5 shows a heterodyne interferometer;

FIG. 6 shows a first manufacturing process in diagram form;

DETAILED DESCRIPTION OF THE INVENTION

Figure 1:
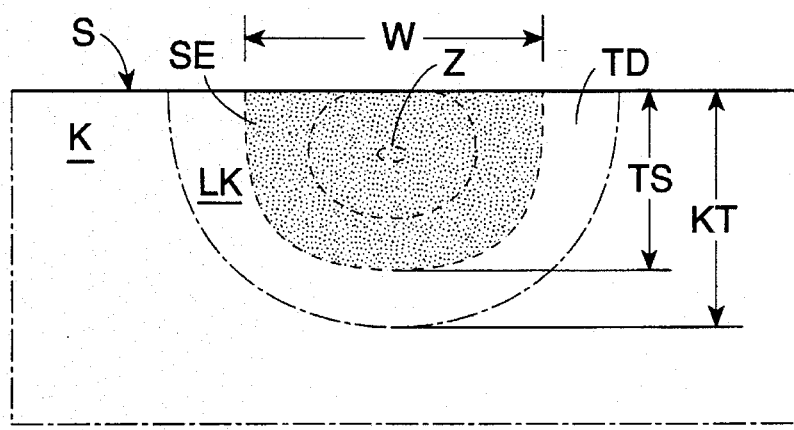
FIG. 1 shows a scaled-up section through a light-guide channel.

FIG. 1 shows a section through a crystal, from the surface of which rare-earth doping has been introduced into a doping region (SE) surrounded by a light-guide channel (LK) formed by a titanium diffusion (TD) or proton exchange. The rare-earth doping region (SE) has a lesser width (W) than the light-guide channel and a lesser doping depth (TS) than a channel depth (KT) of the light-guide channel (LK). The maximum concentration of rare-earth doping (SE) is located in a doping centre (Z) below the crystal surface (S).

Figure 2:
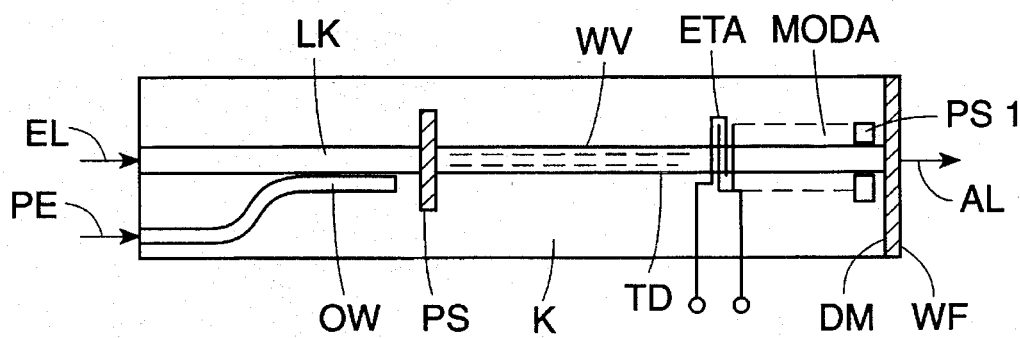
FIG. 2 shows a travelling-wave amplifier.

FIG. 2 shows an integrated optical component consisting of a light-guide channel (LK), part of which incorporates rare-earth doping (SE). This doped portion is adjoined by a waveguide portion having an electro-acoustic transducer (ETA) and a heterodyned acoustic waveguide which forms an acousto-optical modulator. On one side this modulator incorporates a first polariser (PS1) and a dielectric mirror (DM), which is arranged so as to reflect a pump wavelength; on the other side of the rare-earth doping region (SE) is arranged a second polariser (PS), in front of which are arranged a lightwave entrance (EL) and an optical separating filter (OW) which leads to a pump wave entrance (PE). This whole assembly makes up a travelling-wave amplifier (WV) which can be controlled in wavelength-selective manner by the electro-acoustic transducer (ETA) by means of the electrical control signals thereof, with the result that in each case a particular wavelength leaves the rearward mirror (DM) as an amplified output wave (AL). The light-guide channel (LK) is usefully inserted using titanium diffusion (TD). The polariser (PS) is a TE pass polariser applied to the surface.

Figure 3:
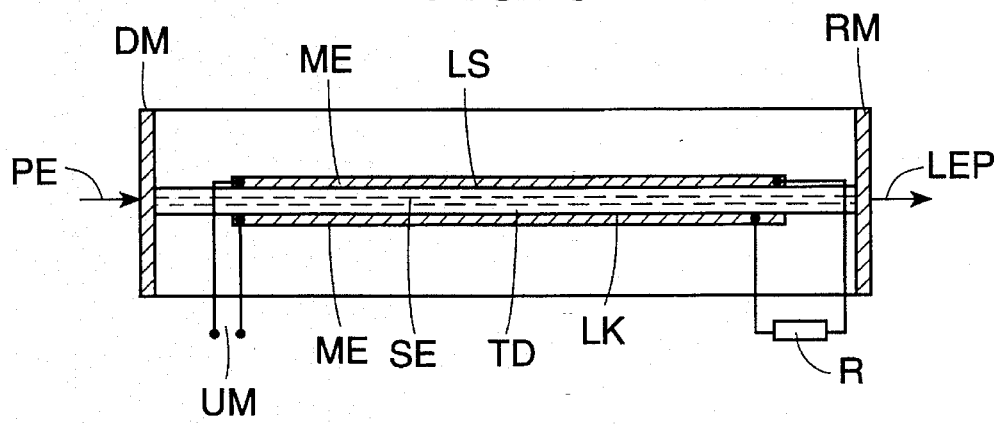
FIG. 3 shows a laser with an electro-optical modulator.

FIG. 3 shows a laser (LS) whose light-guide channel (LK) incorporates rare-earth doping (SE) and which is bounded on both sides by mirrors (DM, RM). One mirror is impinged on externally by the pump wave (PE), and the other mirror allows the laser emission (LEP) to leave. Arranged above the light-guide channel (LK) inserted into the crystal by titanium diffusion (TD) or proton exchange is an electro-optical modulator (MODE) in which modulator electrodes (ME) are arranged to both sides of the light-guide channel (LK) in the manner of an electrical waveguide. A modulator voltage (UM) is applied to these on one side and on the other side they are bounded by a wave resistance (R). Suitable modulation allows the phase of the laser field to be controlled in synchronism with a differential frequency of the laser's axial eigenmode. This enables a periodic sequence of laser emission pulses (LEP) to be generated.

FIG. 4 shows a further laser (LS) whose light-guide channel (LK) has been produced by means of titanium diffusion and which incorporates a rare-earth doping region (SE).

The laser (LS) is bounded at the ends by mirrors (DM, MM), one of which is preferably a dielectric mirror (DM) and the other a metallic mirror (MM) or alternatively a dielectric mirror. The light-guide channel (LK) is heterodyned by a two-stage polarising transducer constituted by an electro-acoustic transducer (ETA) on the side of the pump wave entrance (PE) along with an acoustic waveguide (AWL). This forms an acousto-optical modulator (MODA) which rotates the polarisation in a controlled, wavelength-selective manner, first into the TE mode and then into the TM mode. These two modes are each selectively filtered out by a corresponding polariser (PS, PS1) at the end of the two sections. Thus at the ends the laser emission (LE) exits the mirror (MM) in response to the modulation control. This means that using the mode converter it is possible in each case to preset the appropriate wavelength of the filter in controlled manner, thereby narrowing the frequency of the laser's emission, with the emission frequency being controllable continuously. A one-stage passive wavelength filter with an acousto-optical modulator is described in: J. Frangen et al., Electronic Letters 1989, vol. 25, No. 23. p. 1583–1584.

FIG. 5 shows an integrated optical heterodyne interferometer (HI). Arranged on the crystal (K) are three light-guide channels (LK1–LK3) connected together by selective mode couplers. The device is fed by a pump wave (PE) impinging on the laser (LS), which incorporates rare-earth doping and the emitted light from which supplies the interferometer. Arranged on the crystal are two acoustic waveguides (AW1, AW2) which are fed via an electro-acoustic transducer (E), the electrodes (E10, E11) of which are fed from a modulation generator (GM). The waveguides (AW1, AW2) form modulators (M1, M2) along with the light-guide channels (LK1, LK2), said modulators shifting the frequency of some of the light waves by the acoustic frequency (fa). The first waveguide channel (LK1) is bounded by a mirror (M), and the second waveguide channel (LK2) is bounded by a subject reflector (OM) which modulates the light wave by the measurable variable. The reflected modulated wave is amplified in a travelling-wave amplifier (WV) to the point at which the losses from the subject are compensated. As described, this travelling-wave amplifier (WV) incorporates a rare-earth-doped region into which pump light (PE1) is fed. At the ends the two light-guide channels (LK2, LK3) incorporate detectors (D1, D2), which convert the emerging optical signals into electrical signals which are sent to a differential analyser in conventional manner. The basic functions of such a heterodyne interferometer are outlined in EP 90 105 787.

One advantageous variant of the heterodyne interferometer is exposed to only one, suitably polarised pump light wave (PE), by allowing said wave at the ends through a wavelength-selective mirror (MR), from where it passes along the light-guide channels (LK1, LK2) to the travelling-wave amplifier (WV) and supplies pump energy thereto. The second pump entrance is then no longer necessary. The pump light wave returning from the travelling-wave amplifier (WV) is reflected back into the system at the exits ahead of the detectors (D1, D2) through wavelength-selective mirrors (RM1, RM2) for further use and kept remote from the detectors.

FIG. 6 schematically shows the manufacturing process in seven steps. In the first step of the process, a photoresist (PR) structured using conventional technology is applied to the substrate, thereby producing a photoresist-free channel above the rare-earth doping region. In a second step the rare earth is applied by sputtering or vacuum-evaporation as a metal or metal oxide layer (SS), after which the photoresist (PR) with the layer (SS) thereon is detached using the so-called lift-off technique. This step therefore gives rise on the surface (S) of the crystal (K) to a rare-earth strip (SS1) which in the next step of the process is diffused into the crystal (K). This diffusion is carried out by first tempering (I) in an Ar-O2 atmosphere, the temperature and duration being selected so as to attain a preset diffusion depth that is less than the depth of the light-guide channel to be inserted subsequently. It has been shown that in the case of a Z-section of a lithium niobate crystal a diffusion depth of about 5 μm is achieved in 100 hours at 1050° C., and at 1080° C. a diffusion depth of about 7.2 μm is achieved. The diffusion depth is determined by the 1/e concentration of the surface concentration.

In a further step of the process a silica gel, also known as a sol gel (SG), is applied to the crystal surface (S) and then a second tempering operation (II) carried out, causing the doping to diffuse out close to the surface into the gel, and thereby producing a doping centre (Z) of maximum concentration below the surface (S) of the crystal (K). At the same time the rare-earth doping region (SE) penetrates deeper into the crystal (K). In a further step a layer of titanium (Ti) is put onto the structured photoresist (PR) and the surface (S) of the crystal (K), after which the photoresist is lifted off along with the titanium layer. The titanium (Ti) remaining on the surface (S) is then diffused into the crystal (K) in a third tempering step (III) in an argon/oxygen atmosphere. The titanium strip (Ti) is at first situated above the centre (Z) of the rare-earth doping, with the result that subsequently the light-guide channel coincides in axially parallel manner with the previous doping (see FIG. 1). Ideally a layer initially 95 nm thick is used for the titanium doping, said layer being diffused for 10 hours at 1050° C. Such a waveguide is first and foremost suited to transmission of a 1.53 μm wavelength. It is also suited to monomode operation.

Figure 7:
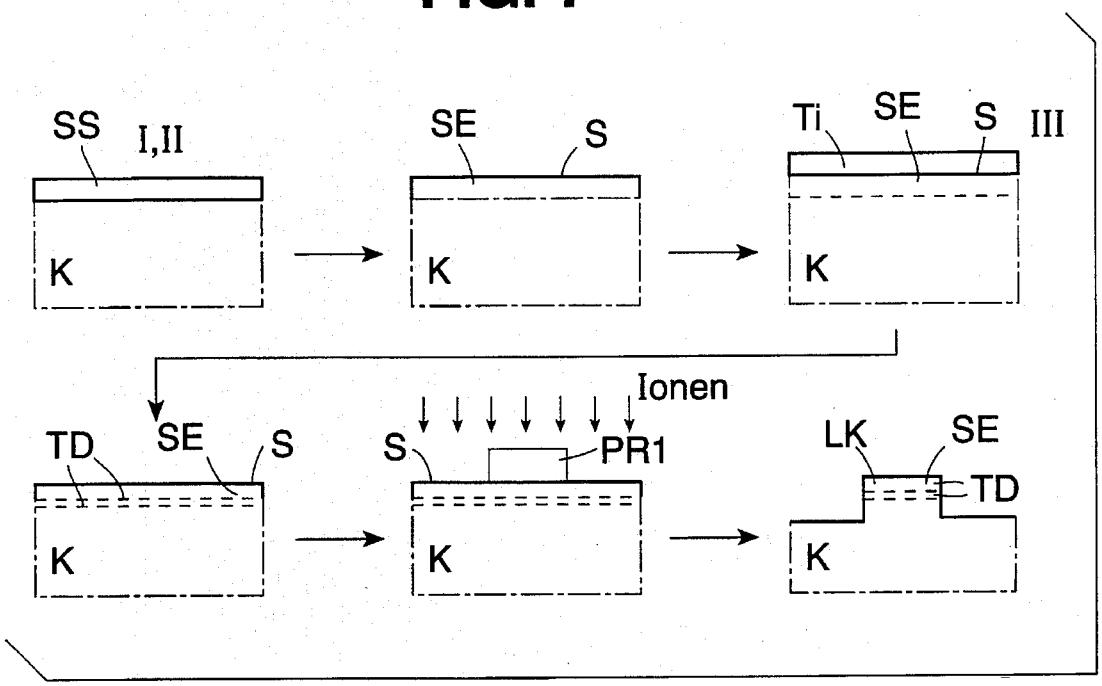
FIG. 7 shows a detail from a second manufacturing process in diagram form.

FIG. 7 shows another method of laterally delimiting the light-guide channel. This process involves first applying the rare-earth layer (SS) over a large area on the crystal (K) and diffusing it in the first tempering operation (I). A planar optical waveguide is then produced over a large area using titanium diffusion or a proton exchange process.

In a further step a photoresist is applied to the large-area doping region (SE) and so structured using the conventional method that a photoresist strip (PR1) is left over what will later be the light-guide channel. In a next step the surplus doped material to the side of the photoresist is etched away using ion etching, after which in a next step the photoresist is detached. This then leaves a narrow strip waveguide doped with the rare earth on the crystal (K).

Figure 8:
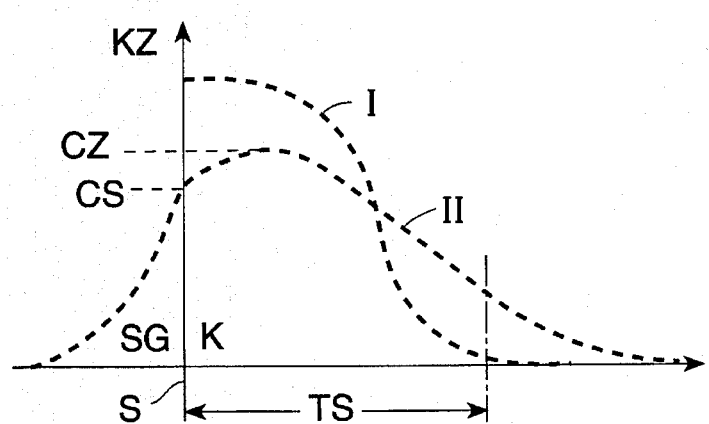
FIG. 8 shows doping profiles after various stages of the process.

FIG. 8 shows a doping cross-section as it appears after the first tempering step (I) and the diffusion tempering step (II). It transpires that the concentration (KZ) initially exhibits a half-bell-curve distribution, and following the second tempering stage (II) at a certain depth below the surface (S) comprises a maximum concentration (CZ) that is higher than a surface concentration (CS). Doping extends to a 1/e doping depth (TS) that is far greater than after the first tempering step (I).

In place of titanium diffusion, in the examples relating to FIGS. 1, 3, 6, 7 and 8 it is also possible to use a proton exchange process, preferably using a metallic mask, e.g. of Cr/Ti or Ta to define the width of the channel. A benzoic acid melt is left to act on the crystal for 2 hours at approx. 200° C., and this is followed by tempering at 350° C. for 3 to 4 hours. This method has the advantage that because of the low temperatures there is no real post-diffusion of the rare-earth doping.

Waveguides, produced in this way have the advantage of being free of optically-induced refractive index changes; however, they only convey the waves in the extraordinary polarisation. This effect is exploited in laser or travelling-wave amplifier Q-control, in that by controlling the polarising rotation the active section is attenuated to a greater or lesser degree.

The titanium-diffused waveguides have the advantage that they convey both types of polarisation, and this makes them particularly suited to polarisation-converting processes. A drawback of the light-guide channels thus produced is the fact that they are not entirely free of optically-induced refractive index change. The consequence of this is felt in particular for wavelengths below one micrometer, which occur when neodyme is used as the rare-earth doping material. Because the wavelength of the erbium emission is above one micrometer, in the case of erbium doping this property of the material is not a critical one.

It is particularly advantageous to use erbium as the doping material because its emission wavelength of 1.53 μm fits the so-called third communication window of the fibre-optic cables. This enables integrated optical components, with their advantages, to be employed for optical communication.

The various rare-earth-doped components illustrated may be produced singly or multiply and in any desired combination on a crystal substrate. This results in an increased integration density and simplified circuits, since there are no intermediate losses at the junction between a plurality of substrates and, for example, a pump light source is to be supplied to a plurality of lasers and/or travelling-wave amplifiers by appropriate distribution of the waves on the substrate. Photolithographic technology can simultaneously be used, i.e. in one step, for both the novel components and for other, already familiar integrated optical components produced on the same substrate and advantageously able to be combined with the novel components. This simplifies production and increases the precision of the overall circuit.

What is claimed is:

1. Waveguide structure having diffused rare-earth doping in a light-guide channel (LK) arranged in a lithium niobate crystal surface (S), characterized in that the rare-earth doping is disposed in an effective rare-earth doping region (SE) approximately coaxially with the light-guide channel (LK), said doping region (SE) having been diffused directly from the crystal surface (S) and, having effective boundaries (W, TS) that are less laterally and depthwise than that of the light-guide channel (LK), at the crystal surface (S) the rare-earth doping is of a lower concentration (CS) than at the centre (Z) of the light-guide channel (LK), and the rare earth is erbium.

2. Waveguide structure according to, claim 1, characterised in that the light-guide channel (LK) consists of titanium diffusion doping (TD).

3. Waveguide structure according to claim 1, characterised in that the light-guide channel (LK) is a proton exchange waveguide (PE).

4. Waveguide structure according to one of the preceding claims, characterised in that its light-guide channel (LK) is an optical travelling-wave amplifier (WV), at the entrance side of which an input light wave (EL) for amplification is to be applied and to which a pump light wave is supplied via a pump wave entrance (PE) and from the exit side of which the input light wave (EL) emerges directly as an amplified output light wave (AL), or emerges through a wavelength-selective mirror (DM) which reflects the pump light wave into the travelling-wave amplifier region, with the result that said pump light wave also amplifies the input light wave (EL) in the reverse direction.

5. Waveguide structure according to claim 4, characterised in that the pump wave in the travelling-wave amplifier (WV) is to be coupled by means of a wavelength-selective integrated optical filter (OW) directly into the optically active rare-earth doping region (SE) in the light-guide channel (LK).

6. Waveguide structure according to claim 4, characterised in that arranged on the light-guide channel (LK) is an integrated optical wavelength filter (WF) whose wavelength sensitivity is controlled, thereby producing controlled wavelength-selective amplification of the input light wave (EL).

7. Waveguide structure according to claim 4, characterised in that the travelling-wave amplifier (WV) is coupled optically in serial fashion to a lossy integrated optical component (VB) arranged on the same lithium niobate crystal (K), and the travelling-wave amplifier (WV) is designed and controlled so as to amplify in such a manner that it operates together with the lossy component (VB) as an O-dB component.

8. Waveguide structure according to claim 1, 2 or 3, characterised in that the light-guide channel (LK) is a laser (LS), by virtue of the fact that the rare-earth doping region (SE) is bounded at one end by a dielectric mirror (DM) or by a metallic mirror (MM) or by a surface relief grid (RM) and at the other end by an identical or respective different one of the said reflectors (DM, RM, MM), as well as being connected to a pump wave entrance (PE).

9. Waveguide structure according to claim 8, characterized in that the laser (LS) is coupled optically to at least one other integrated optical component which is arranged on the same lithium niobate crystal (K) outside the laser (LS) or spatially overlaid therewith or effective therewithin or spatially overlaid therewith and effective therewithin.

10. Waveguide structure according to claim 9, characterised in that the other optical component is a controllable electro-optical or acousto-optical or nonlinear optical transducer or acousto-optical and nonlinear optical transducers, by means of which an emission (LE, LEP) produced by the laser (LS) is controlled in phase or amplitude or frequency or amplitude and frequency.

11. Waveguide structure according to claim 10, characterised in that the optical component is an electro-optical phase modulator effectively heterodyned with the laser (LS) and by means of which an electrical modulator field control system is to be used to modulate the phase of a laser wave field in synchronism with the differential frequency of neighbouring axial eigenmodes of the laser (LS), in such a way that the laser (LS) emits a periodic sequence of laser emission pulses (LEP) using mode coupling.

12. Waveguide according to claim 10, characterised in that the optical component is a controllable acousto-optical modulator (MODA) effectively heterodyned with the laser (LS), said modulator forming a mode converter which in controlled manner effects Q-control by which the laser (LS) emits short laser pulses (LEP) in controlled manner.

13. Waveguide structure according to claim 12, characterised in that the optical component is a controllable two-stage acousto-optical mode converter (MODA) with interposed polarisors (PS, PS1) which is effectively heterodyned with the laser (LS), said mode converter forming a wavelength filter whose sensitivity can be controlled, with the result that the frequency of the emission (LE) of the laser (LS) can be continuously controlled.

14. Waveguide structure according to claim 7, characterised in that on the lithium niobate crystal (K) the optically integrated components of a heterodyne interferometer (HI) together with the laser (LS) are arranged as a light source and optically coupled or optically coupled to at least one of the attenuation-compensating travelling-wave amplifiers (WV) to which at least one pump light wave (PE, PE1) is supplied.

15. Waveguide structure according to claim 5, characterised in that arranged on the light-guide channel (LK) is an integrated optical wavelength filter (WF) whose wavelength sensitivity is controlled, thereby producing controlled wavelength-selective amplification of the input light wave (EL).

16. Waveguide structure according to claim 5, characterised in that the traveling-wave amplifier (WV) is coupled optically in serial fashion to a lossy integrated optical component (VB) arranged on the same lithium niobate crystal (K), and the travelling-wave amplifier (WV) is designed and controlled so as to amplify in such a manner that it operates together with the lossy component (VB) as an O-dB component.

17. Waveguide structure according to claim 6, characterised in that the traveling-wave amplifier (WV) is coupled optically in serial fashion to a lossy integrated optical component (VB) arranged on the same lithium niobate crystal (K), and the travelling-wave amplifier (WV) is designed and controlled so as to amplify in such a manner that it operates together with the lossy component (VB) as an O-dB component.

18. Waveguide structure according to claim 9, characterised in that on the lithium niobate crystal (K) the optically integrated components of a heterodyne interferometer (HI) together with the laser (LS) are arranged as a light source and optically coupled, or optically coupled to at least one of the attenuation-compensating travelling-wave amplifiers (WV) to which at least one pump light wave (PE, PE1) is supplied.

19. Method of manufacturing a waveguide structure in which rare-earth doping is introduced into a lithium niobate crystal (K) by tempering into a rare-earth doping region (SE) of preset depth (TS) below a crystal surface (S), after which a light-guide channel (LK) is produced by titanium diffusion or proton exchange in the rare-earth doping region (SE), characterised in that the rare earth is applied as a metal or oxide layer (SS) onto the crystal surface (S) and thereafter a first tempering step (I) is performed at a temperature above 1000° C. in an AR/O$_2$ atmosphere, with depth-oriented rare-earth diffusion taking place, after which the crystal surface (S) is coated with a sol gel (SG), after which in a second tempering step (II) the rare-earth doping is diffused close to the surface, thereby producing a lower rare-earth concentration (CS) at the surface than deeper down, after which the sol gel (SG) is etched away.

20. Method according to claim 19, characterised in that a photoresist layer (PR) is applied to the crystal surface (S), said layer is masked and strips thereof above the envisaged rare-earth doping region (SE) are illuminated and then etched, thereafter the rare-earth metal layer or rare-earth oxide layer (SS) is applied by high-vacuum evaporation or sputtering and then the remaining photoresist layer (RR) is detached with the superjacent layer (SS) in a lift-off operation, thereby producing a rare-earth strip or rare-earth oxide strip (SS1), whereupon tempering (I, II, III) with rare-earth diffusion takes place.

21. Method according to claim 20, characterised in that the rare-earth strip or rare-earth oxide strip (SS1) is narrower than the envisaged light-guide channel (LK).

22. Method according to claim 19, characterised in that after the first or, if applicable, second tempering (I, II) to the rare-earth doping and after the light-guide layer has been produced over a large area by the lithium diffusion or proton exchange, a photoresist process is then used to produce a photoresist strip (PR1) over the envisaged rare-earth doping region (SE) and light-guide channel, this is followed by ion beam etching of the crystal surface (S) not covered by the photoresist (PR1), at least by the attained rare-earth diffusion depth (TS) and light-guide channel depth, and then the photoresist strip (PR1) is removed, whereupon any surface diffusion required is performed.

23. Method according to one of claims 19, and 20, to 22, characterised in that the light-guide channel (LK) is introduced into the crystal surface (S) with the rare-earth diffusion region (SE) by titanium diffusion (TD) from a photolithographically structured titanium layer approximately 95 nm thick for 10 hours at a temperature of 1050° C. in an Ar/O2 atmosphere.

24. Method according to any one of claims 19, and 20 to 22, characterised in that the light-guide channel (LK) is produced by proton exchange (PA) using lithium-hydrogen ion exchange through a metallic mask at approx. 200° C. in a 1 mole percent lithium-benzoate-buffered benzoic acid melt in approx. 2 hrs with subsequent tempering at 350° C. for 3–4 hrs.

* * * * *

UNITED STATES PATENT AND TRADEMARK OFFICE
CERTIFICATE OF CORRECTION

PATENT NO. : 5,473,722
DATED : December 5, 1995
INVENTOR(S) : Sohler et al.

It is certified that error appears in the above-indentified patent and that said Letters Patent is hereby corrected as shown below:

Column 1, line 28, "$^4I_{14/2} - {}^4I_{15/2}$" should read --$^4I_{13/2} - {}^4I_{15/2}$--.
Column 5, line 64, "structured" should read --structure--.
Column 7, line 54, "to, claim" should read --to claim--.
Column 8, line 63, "polarisors" should read --polarisers--.
Column 9, line 5, "optically coupled or optically coupled" should read --optically coupled, or optically coupled--.
Column 10, line 33, "20, to 22," should read --20 to 22,--.

Signed and Sealed this

Fourth Day of June, 1996

Attest:

BRUCE LEHMAN

Attesting Officer          Commissioner of Patents and Trademarks